United States Patent [19]

Parker et al.

[11] 4,377,966
[45] Mar. 29, 1983

[54] SERVO BOOSTERS FOR VEHICLE BRAKING SYSTEMS

[75] Inventors: David J. Parker; Eric M. Lilley, both of Solihull, England

[73] Assignee: Lucas Industries Limited, Birmingham, England

[21] Appl. No.: 237,494

[22] Filed: Feb. 23, 1981

[30] Foreign Application Priority Data

Feb. 23, 1980 [GB] United Kingdom ............... 8006183

[51] Int. Cl.³ .................................... F01B 19/02
[52] U.S. Cl. ................................ 92/48; 91/533; 92/36; 92/44; 92/98 D; 92/165 PR
[58] Field of Search .............. 60/547 R, 581; 92/42, 92/36, 44, 48, 98 D, 97, 165 PR; 91/369 R, 369 A, 376 R, 533

[56] References Cited

U.S. PATENT DOCUMENTS

| | | | |
|---|---|---|---|
| 3,350,882 | 11/1967 | Leising | 91/369 R |
| 3,413,990 | 12/1968 | Gachet | 92/42 |
| 4,256,016 | 3/1981 | Thomas | 91/369 A |

Primary Examiner—Abraham Hershkovitz
Attorney, Agent, or Firm—Scrivener, Clarke, Scrivener & Johnson

[57] ABSTRACT

In a servo booster for a vehicle braking system, of the kind having a tie rod for relieving the booster housing of braking reaction forces which extends through the movable wall(s) of the booster, the movable wall is sealingly connected to a wall of the housing by a bellows located substantially coaxially about the tie rod. The bellows has at least one integral reinforcing rib which completely encircles the tie rod. The rib resists ballooning of the bellows and also guides the bellows along the tie rod. In the case of a tandem booster having a stationary partition wall between a pair of movable walls, the interior of a bellows connecting the rear movable wall to the partition wall provides fluid communication between the chambers bounded by the rears of the movable walls. Fluid communication between the other two chambers is provided via a tubular member integral with the front movable wall and extending sealingly through the partition wall.

13 Claims, 1 Drawing Figure

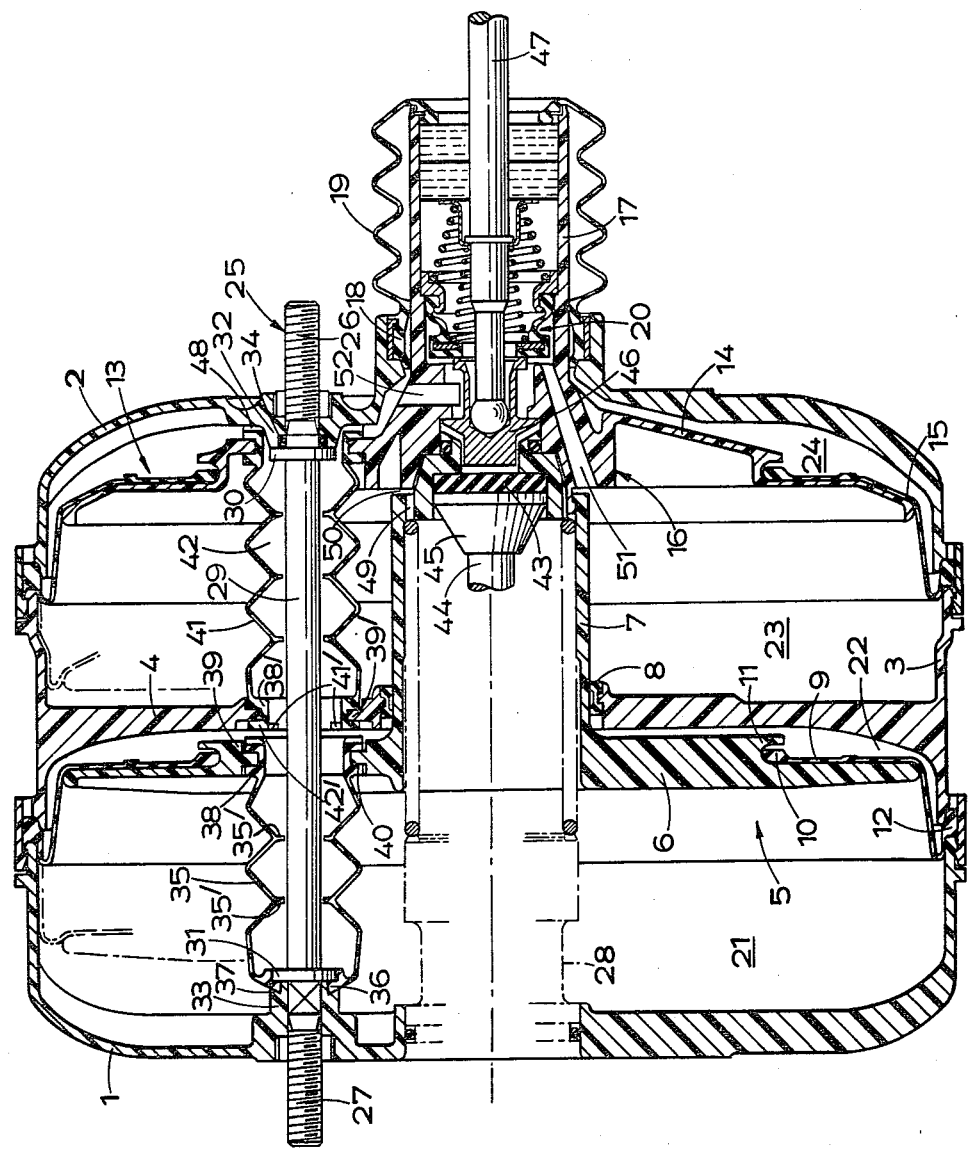

SERVO BOOSTERS FOR VEHICLE BRAKING SYSTEMS

This invention relates to servo boosters for vehicle braking systems, of the kind having a stationary force transmitting member which extends sealably through the movable wall of the booster for transmitting braking reaction forces.

Boosters of this kind have been disclosed in United Kingdom Patent Specification No. 2 009 871A. In those boosters the movable wall was sealed to the force transmitting member by a sliding seal or a rolling diaphragm.

According to the present invention, a servo booster for a vehicle braking system comprises a housing containing a movable wall having sealing means sealing the outer periphery of the movable wall to the housing, a stationary force transmitting member extending through the movable wall, and a bellows located substantially co-axially about the force transmitting member and sealingly connecting the movable wall to a wall of the housing.

The wall of the housing to which the bellows is connected preferably lies in front of the movable wall, so that the bellows is progressively collapsed on forward movement of the movable wall to apply the brakes.

In a preferred form of construction, the bellows has at least one integral reinforcing rib which encircles the force transmitting member. The rib may help to prevent the bellows from ballooning under the pressure differentials to which the bellows will sometimes be subjected. The rib is preferably formed on the inside of the bellows wall at a reduced-diameter portion. The rib may be arranged to guide the bellows along the force transmitting member during movement of the movable wall.

Although the booster may be one which has only a single movable wall, the bellows may be used in a tandem servo booster having at least two co-acting movable walls located on opposite sides of a partition wall of the housing so as to form four pressure chambers, the force transmitting member extending through both movable walls and the partition wall. In such uses, the bellows is preferably arranged to connect one of the movable walls with the partition wall, and an annular space between the bellows and the force transmitting member provides fluid communication between an alternate two of the chambers.

In United Kingdom Patent Specification No. 2 022 207A it was proposed to provide the force transmitting members of a tandem servo booster with internal passages to provide fluid communication between alternate booster chambers. It is not easy to provide such internal passages without making the tie rods in several parts. The present proposal avoids the need for such internal passages.

The bellows may be sealed to the partition wall by a direct sealing engagement between the bellows and the radially inner margin of the partition wall that defines the aperture in the partition wall through which the force transmitting member extends. Several legs, or an annular rib, may be formed inside the portion of the bellows received in the aperture, to help prevent the bellows becoming dislodged from the aperture.

In a preferred arrangement the bellows sealingly engages the margin of the rear movable wall that defines the aperture in the rear movable wall through which the force transmitting member extends, and, when that movable wall is in its rearmost position, the aperture receives at least part of the connection between the force transmitting member and the rear wall of the housing. This permits a reduction in the length of the booster for a given stroke of the movable wall.

When there are two or more force transmitting members a respective bellows may be provided for each such member. The bellows may be arranged to connect together different pairs of chambers, or they may connect the same two chambers.

The two chambers unconnected by the bellows may be placed in fluid communication by a tubular member firmly connected to the movable wall that is not connected to the bellows, the tubular member extending sealingly through the partition wall.

In a particularly compact form of construction, the movable wall to which the tubular member is firmly connected is the front one, and an output member of the booster is positioned substantially co-axially within the tubular member.

BRIEF DESCRIPTION OF THE DRAWING

A tandem vacuum servo booster in accordance with the invention will now be described, by way of example only, with reference to the accompanying drawing which is a view of the booster in longitudinal cross-section. The upper half of the drawing is a section on a plane which is oriented at an angle of 135° about the booster axis to that of the lower half.

The booster is designed for use in the braking system of a vehicle and includes a moulded plastics housing comprising a front shell 1, a rear shell 2 and a cylindrical intermediate part 3 integral with a partition wall 4. A front movable wall 5 comprises an annular diaphragm support plate 6 integral with a tubular member 7 which extends rearwardly through the partition wall 4. The tubular member 7 is slidably sealed to the partition wall by an annular seal 8. A flexible diaphragm 9 seals the outer periphery of the movable wall to the housing. The diaphragm is sealed to the support plate 6 by a bead 10 received in an outwardly facing recess 11 in the plate 6. The outer edge of the diaphragm 9 has a peripheral bead 12 which is sealingly trapped between the front shell 1 and the intermediate part 3 of the housing.

A rear movable wall 13 comprises a similar arrangement of a flexible diaphragm 15 and an annular diaphragm support plate 14 which, at its radially inner periphery, is formed integrally with a substantially cylindrical valve body 16. The rear end 17 of the valve body 16 extends slidably through a central aperture in rear shell 2 and is sealed to shell 2 by an annular seal 18 formed on the front end of a sealing boot 19. A substantially conventional poppet valve assembly 20 is located within the bore of valve body 16 and since its operation will be fully understood by those skilled in the art it will not be described in detail.

A pair of diametrically opposed force transmitting members in the form of tie rods 25 extend axially right through the booster to relieve the booster housing of braking reaction forces. The rods 25 are provided with threaded end portions 26 and 27 which will usually be connected respectively to a vehicle bulkhead and to a flange on a master cylinder housing. (The rear end 28 of a master cylinder housing is indicated in chain-dotted outline). Each tie rod 25 comprises a plain cylindrical mid portion 29 which terminates in radial flanges 30 and 31 which abut the inner ends of respective inwardly extending tubular bosses 32 and 33 formed on shells 2 and 1 respectively. The rear end of each rod 25 is sealed to the rear shell 2 by an annular seal 34 adjacent to the flange 30. The flanges 30, 31, and bosses 32, 33, together with the seals 34, constitute a connection between the respective end portions of each tie and the housing.

Four chambers 21, 22, 23 and 24 are defined within the booster housing. In use, the front chamber 21 is permanently connected to a vacuum source by a connector, not shown, provided on front shell 1.

Each tie rod 25 is associated with a respective first bellows 35, formed of rubber, located substantially co-axially about the tie rod between the front movable wall 5 and the front shell 1. At its rear end the bellows 35 has an annular bead 38 of rectangular section having an external annular recess 40 which receives a radially inwardly directed rib 39 defining the aperture through which the tie rod 25 extends. The front end of the bellows has a bead 36 of triangular section which is trapped between the front face of flange 31 and an inclined face 37 formed on boss 33, thus effecting a seal between the bellows and the front shell 1, and also between the front shell and the tie rod 25.

The bellows 35 comprises three convolutions, and integral radially inwardly directed reinforcing ribs 35' are formed at the junction between the reduced diameter ends of adjacent convolutions, to encircle the tie rod. The ribs 35' provide resistance to ballooning of the bellows when it is subjected to a pressure difference across its wall. They also guide the bellows along the tie rod as the movable wall moves back and forth, thus ensuring a smooth action.

A second bellows 41 is similarly arranged substantially co-axially around each tie rod 25, sealingly connected at its front and rear ends to the partition wall 4 and support plate 14 respectively, in a similar manner to that by which the rear end of bellows 35 is connected to the plate 6. However, at the front end of these bellows, the bead 38', unlike the bead 38, is provided with a series of circumferentially spaced radially inwardly directed legs 41' which help to prevent the bead 38' from becoming dislodged from rib 39' under the pressure difference to which the bellows 41 is subjected in use. The legs 41' co-operate with the portion 29 of the tie rod 25 to prevent the flange portion 42' of the bead 38' from being pulled rearwardly through the respective aperture in the partition wall 4. In a modification (not shown) the legs 41' are replaced by a circumferentially continuous, radially inwardly directed rib, but the use of legs is preferred in order to permit fluid to flow freely between the chamber 22 and the interior 42 of the bellows 41. The interior 42 of each of the bellows 41 provides permanent fluid communication between the two chambers 22 and 24 bounded by the rears of the respective movable walls 5 and 13.

The bellows 35 and 41 progressively collapse axially on forward movement of the movable walls 6 and 13 but chambers 22 and 24 are at all times in free communication with each other. In order to maintain communication through the interior 42 of the bellows 41 when the rear movable wall is in its fully retracted (righthand) position, the rear bead on bellows 41 is provided with radial recesses 48 in its rear face. In this retracted position the flange 30 on the tie rod 25 and the boss 32 on the rear shell 2 are both received in the aperture in the rear movable wall through which the tie rod extends.

The tubular member 7 is stepped at its rear end to receive an elastomeric reaction disc 43 which is located, in the usual way, between a head 45 on an output rod 44 and a valve control member 46 operated by an input rod 47. The output rod 44 is positioned substantially co-axially within the tubular member 7. Axial passages 49 and radial recesses 50 are provided in the stepped rear end of the tubular member 7 to provide continuous fluid communication between chambers 21 and 23 via the interior of tubular member 7.

Valve body 16 has passages 51 and 52 which connect respectively with chambers 23 and 24 and with the valve seats controlled by poppet valve assembly 20. In the retracted position of the input rod 47, as shown, the passages 51 and 52 are placed in communication so that all four of the chambers are connected to the vacuum source, but on forward movement of the input rod passages 51 and 52 are isolated one from the other, and passage 52 is connected to atmosphere to supply atmospheric air to the chambers 22 and 24.

In a modification (not shown) the first bellows members 35 are both replaced by rolling diaphragms connected between the support plate 6 and the respective tie rods 25, and an independent seal is provided in place of each bead 36 to seal the tie rods to the front shell 1.

Although the invention has been illustrated with specific reference to a vacuum servo booster, the invention is also applicable to boosters which employ a source of super-atmospheric pressure.

We claim:
1. A servo booster for a vehicle braking system, comprising a booster housing, first and second co-acting movable walls located within said housing, a partition wall of said housing located between said movable walls, a stationary force transmitting member extending through said movable walls and said partition wall, a surface of said second movable wall and a surface of said partition wall defining between them a first chamber, a surface of said first movable wall remote from said partition wall bounding a second chamber, seal means sealing the outer peripheries of said movable walls to the housing, and a bellows located substantially co-axially about said force transmitting member and sealingly connecting said first movable wall to said partition wall, an inner surface of said bellows and an outer surface of said force transmitting member defining between them a space by which said first chamber is in fluid communication with said second chamber.

2. A servo booster according to claim 1, including at least one reinforcing rib which is integral with said bellows and which encircles said force transmitting member.

3. A servo booster according to claim 2, in which said reinforcing rib is formed on the inside of said bellows.

4. A servo booster according to claim 3, including a reduced-diameter portion of said bellows on which said reinforcing rib is formed.

5. A servo booster according to claim 4, in which said reinforcing rib serves to guide said bellows along said force transmitting member during movement of said movable wall.

6. A servo booster according to claim 1, including a radially inner margin of said partition wall defining an aperture in the partition wall through which said force transmitting member extends, and a direct sealing connection between said bellows and said margin.

7. A servo booster according to claim 6, including an external surface of said bellows defining an annular recess in which said margin of said partition wall is received.

8. A servo booster according to claim 7, including a plurality of radially inwardly extending legs integrally formed on said inner surface of said bellows within said aperture in said partition wall.

9. A servo booster according to claim 1, including a radially inner margin of said first movable wall defining an aperture in said first movable wall through which said force transmitting member extends, and a direct sealing engagement between said bellows and said margin of said first movable wall.

10. A servo booster according to claim 9, including an assembly forming a sealed connection between said force transmitting member and said housing and received within said aperture in said first movable wall when said first movable wall is in a retracted position.

11. A servo booster according to claim 1, including a further surface of said further movable wall remote from said partition wall and bounding a third chamber, a further surface of said partition wall facing said first movable wall and a further surface of said first movable wall facing said partition wall and defining between them a fourth chamber, and further including a tubular member firmly connected to said further movable wall and slidably extending sealingly through said partition wall, and an inner surface of said tubular member defining a passageway by which said third chamber is in fluid communication with said fourth chamber.

12. A servo booster according to claim 11, including an output member of said booster positioned substantially coaxially within said passageway of said tubular member.

13. A servo booster according to claim 1, including a front wall of said housing located on the opposite side of said further movable wall from said partition wall, and a further bellows located substantially coaxially about said force transmitting member and sealingly connecting said further movable wall to said front wall.

* * * * *